INVENTORS.
P.L.M. van BERKEL
A.A. SPANJERSBERG
BY Hugh A. Kirk
ATT'Y.

INVENTORS.
P.L.M. van BERKEL
A. A. SPANJERSBERG
BY
Hugh A. Kirk
ATT'Y.

INVENTORS.
P. L. M. van BERKEL
A. A. SPANJERSBERG
BY
ATT'Y.

INVENTORS.
P. L. M. van BERKEL
A. A. SPANJERSBERG
BY
Hugh A. Kirk
ATT'Y.

INFORMATION BEARER AND PHOTO-ELECTRIC READING DEVICE THEREFOR

Filed Feb. 11, 1965

INVENTORS.
P.L.M. van BERKEL
A.A. SPANJERSBERG
BY
ATT'Y.

INVENTORS
P.L.M. van BERKEL
A.A. SPANJERSBERG
BY Hugh A. Kirk
ATT'Y.

INFORMATION BEARER AND PHOTO-ELECTRIC READING DEVICE THEREFOR

Filed Feb. 11, 1965

INVENTORS
P. L. M. van BERKEL
A. A. SPANJERSBERG
BY
Hugh A. Kirk
ATT'Y

United States Patent Office 3,437,793

Patented Apr. 8, 1969

3,437,793

INFORMATION BEARER AND PHOTO-ELECTRIC READING DEVICE THEREFOR

Petrus Ludovicus Maria van Berkel, Voorburg, and Arie Adriaan Spanjersberg, Leidschendam, Netherlands, assignors to De Staat der Nederlanden, ten Deze Vertegenwoordigd Door de Directeur-Generaal der Posterijen, Telegrafie en Telefonie, The Hague, Netherlands

Continuation-in-part of application Ser. No. 82,495, Jan. 13, 1961. This application Feb. 11, 1965, Ser. No. 431,926

Int. Cl. G06k *15/18*

U.S. Cl. 235—61.7 11 Claims

ABSTRACT OF THE DISCLOSURE

A photoelectric reading device for an information bearer having a grid of columns and rows of marking areas aligned with synchronization marks, which device includes a light filter means so that only the synchronization marks and marks made in the marking areas are detected by the photoelectric reading device. This device also includes means for indicating the relative position of the bearer wtih respect to the photoelectric scanners, and selector means responsive to this position indicating means for controlling which scanners will be connected to detect the marks made in the marking areas. Also this device has two successive scanning stations for each of the marks read, and means for comparing the scanning results from each station for the detection of errors.

*Related applications*

This application is a continuation-in-part application of applicants' copending U.S. patent application Ser. No. 82,495 filed Jan. 13, 1961, now abandoned, and bases its priority on Netherlands patent application Ser. No. 248,047, filed Feb. 3, 1960, as well as other foreign prior patent applications, namely: German application Ser. No. St. 17,394 filed Jan. 26, 1961; England application 2,749/61 filed Jan. 24, 1961, and France patent application Ser. No. 851,155 filed Jan. 30, 1961.

*Background of the invention*

A related prior photo-electric reading device is described in Italian Patent No. 589,383. In this prior device the first in a row of photocells scans a column of synchronizing spaces, and the others photocells scan an equal number of columns of white marking spaces, all in a block marking-grid area. The marking-grid area has a dark shade of color and the marking spaces are white, so that in scanning a square-wave voltage will appear at the output terminal of the photocell for each blank white space, and the failing of one of the peaks of the square wave corresponds to a filled-in marking-space. Accordingly one has to contend, on the one hand, with the drift of the voltage level corresponding to white during the occurrence of the square-wave in accordance with a repetition impulse times determined by the circuit, and on the other hand, with the difficulty that the amplitude of the signal caused by a marked or filled-in space is large with respect to the amplitude of the peaks or signals from the white or unfilled-in spaces. Thus, if the information bearer, such as a check, with the marking-grid area to be scanned is displaced a little to the left or to the right with respect to the row of photocells the reading will not be carried out correctly. Furthermore, if the marked space is weakly marked the signal-to-noise ratio is high and the reading also may not be carried out correctly.

Accordingly, it is an object of this invention to overcome the above difficulties in the above mentioned prior art Italian patent and to provide a device in which the correct reading is obtained notwithstanding continued displacement of the information bearer or the presence of a weak signal from a marked grid.

Another object is to provide such a device in which only marked spaces are read and not the absence of signals in a square wave or the reduction in amplitude of one of the signals in such a wave.

Another object is to produce such a device which automatically senses the position of the information bearer relative to the scanning photoelectric cells.

Another object is to provide a definite column of synchronizing pulses for not only synchronizing the timing of the scanning but also the position of the marking spaces of the information bearer relative to the scanning devices.

Another object is to scan each information twice and compare the information scanned so as to check if there are any defects in the apparatus or if one of the two scanning systems is faulty or inoperative.

Another object is to provide such a device which tells if more than one marking space in a column of marking spaces in the marking grid has been marked, thereby checking the accuracy of the information bearer, wherein only one mark is to be made in each column of the marking grid.

Another object is to provide means whereby the photoelectric sensing device of this invention only responds to the synchronizing marks on a marking grid and dark colored markings on fill-ins on the marking grid, and not to any of the colors of the grid itself or of this bearer sheet or card.

*Summary of the invention*

Generally speaking, this invention comprises an information bearer with a specific marking grid thereon, and an apparatus which in combination with the color of the marking grid on said information bearer, includes a light filter means in the scanning part of the apparatus which renders the apparatus insensitive to the color of the grid and the bearer sheet and only sensitive to the synchronizing marks of a contrasting color on or adjacent the grid and to the contrasting colors of the fill-in marks on the grid. Thus only these contrasting colors are detected through the filter means for sensing only the information to be read from the information bearer.

Furthermore the apparatus of this invention comprises two identical scanning stations, each consisting of a row of photocells, which scan areas adjacent to each other. To achieve a high reliability each area is scanned by each of the two scanning stations. The size of the area scanned is, at the most, that of a marking-space on the grid, and a photocell observes unmarked marking-spaces and intervals between marking-spaces as equal or the same; a row of marking-spaces being scanned successively by each station. The output voltages of the photocells scanning the column of synchronizing marks of a contrasting easily detectable color determine which output terminals of the remaining photocells are connected to a set of memory circuits, after which the states of the memory circuits are compared.

The above mentioned and other features, objects, and advantages and the manner of attaining them are described specifically below by reference to an embodiment of the invention shown in the accompanying drawings, wherein.

Figure 1:
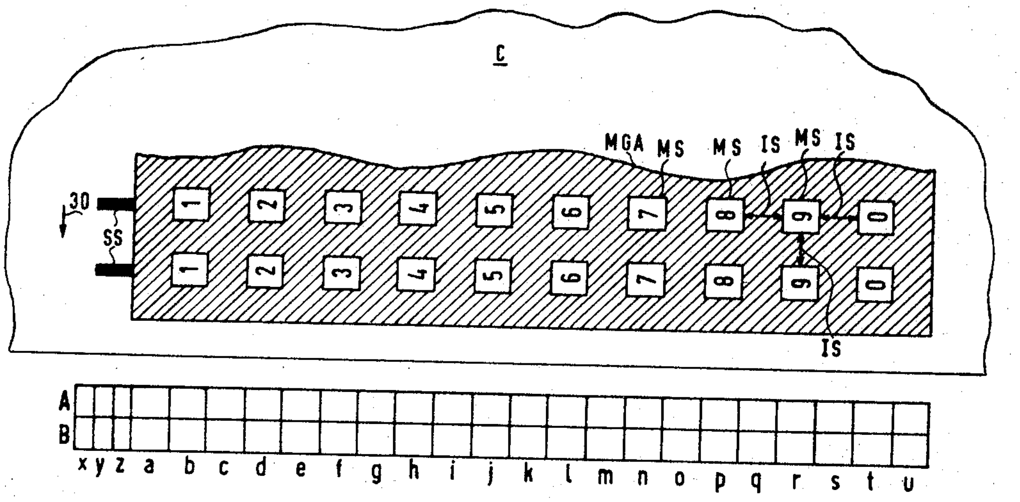
FIG. 1 shows at the top, a part of a marking-grid area on an information bearer or sheet, which grid area shows two rows of marking-spaces and two synchronizing stripes or marks, one at the end of each row; and at the bottom, a grid of the areas scanned by the photocells in the two identical scanning stations A and B of the reading device.
Figure 3:
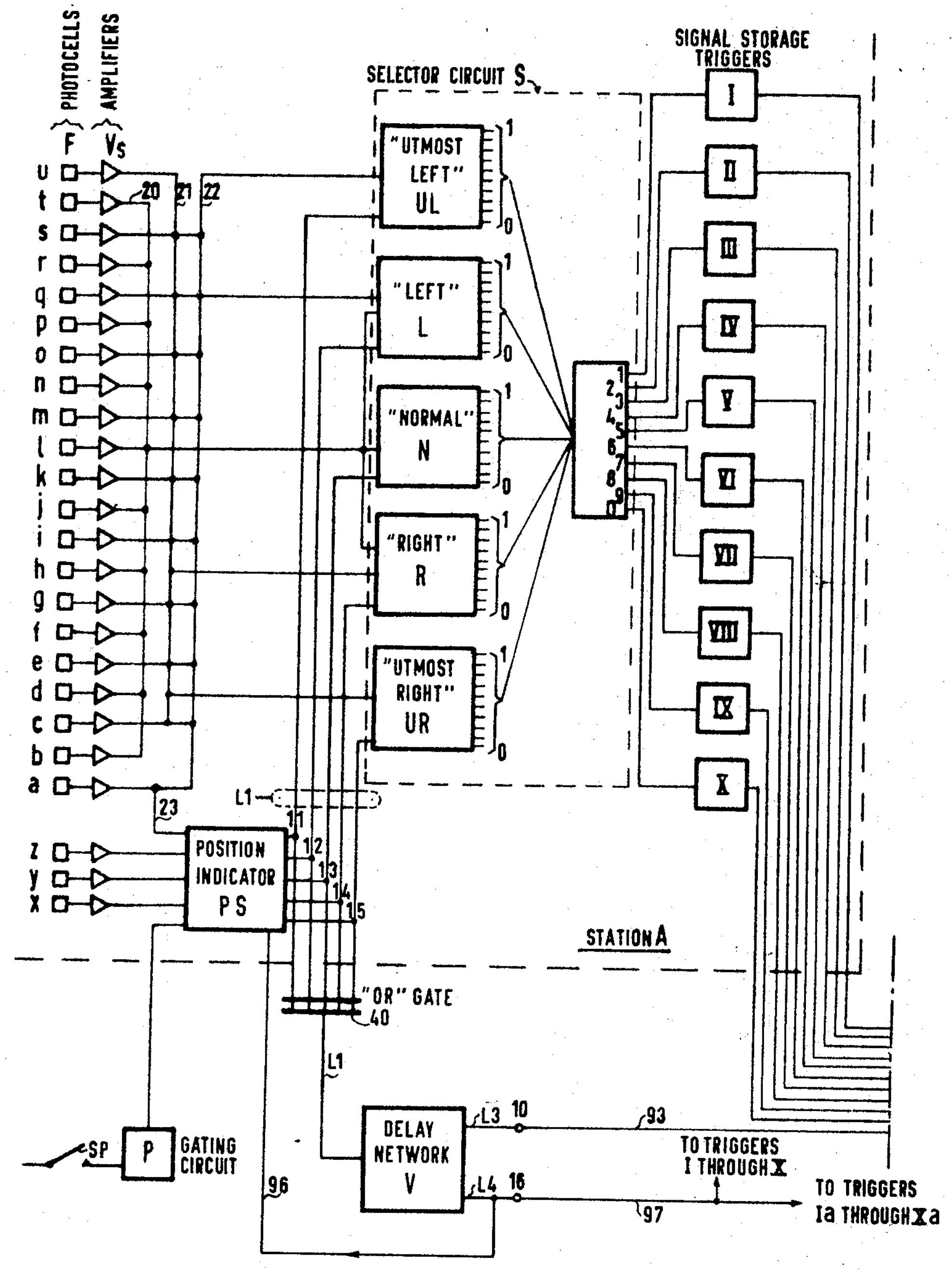
Figure 3:
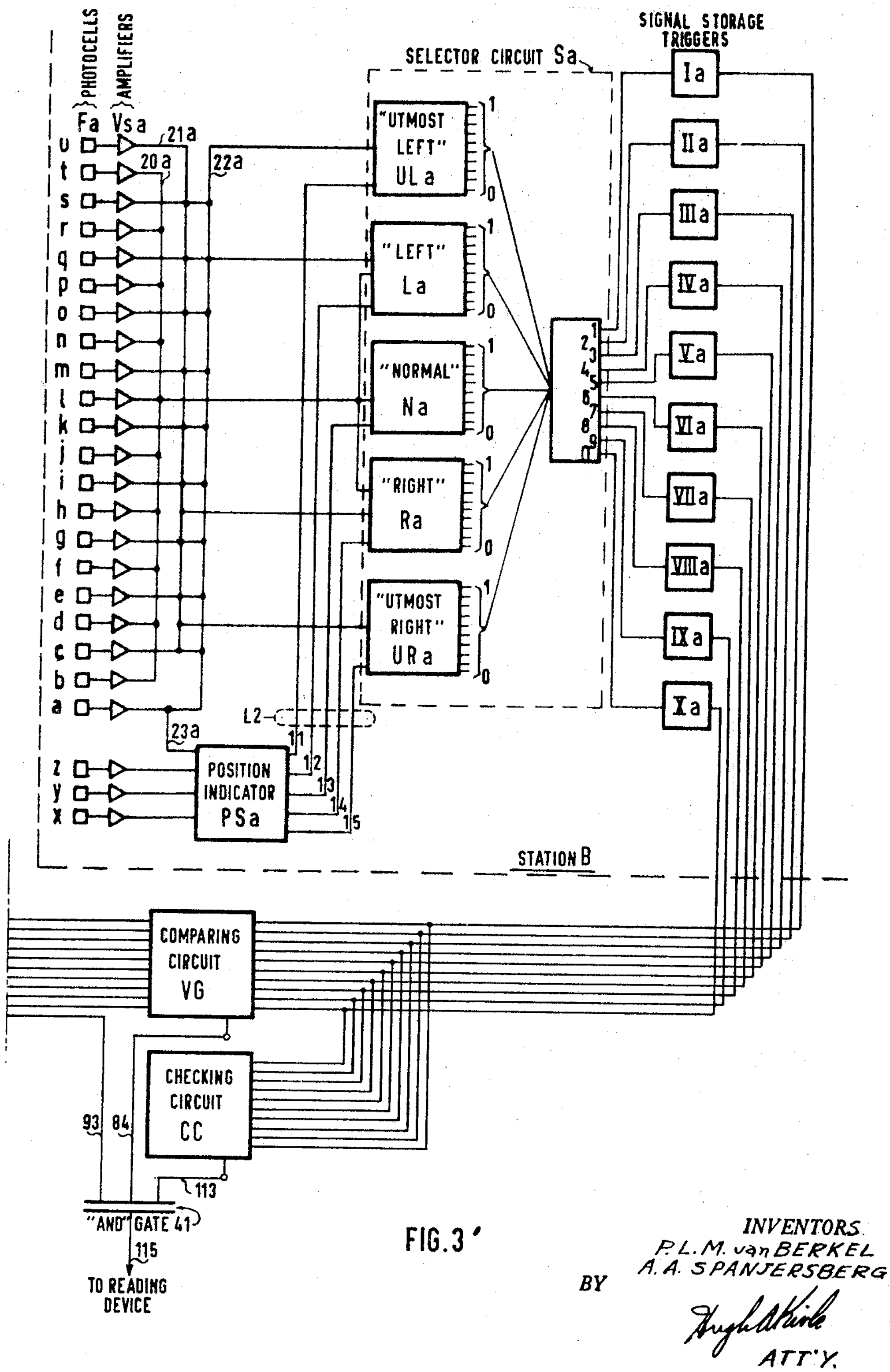
Figure 4:
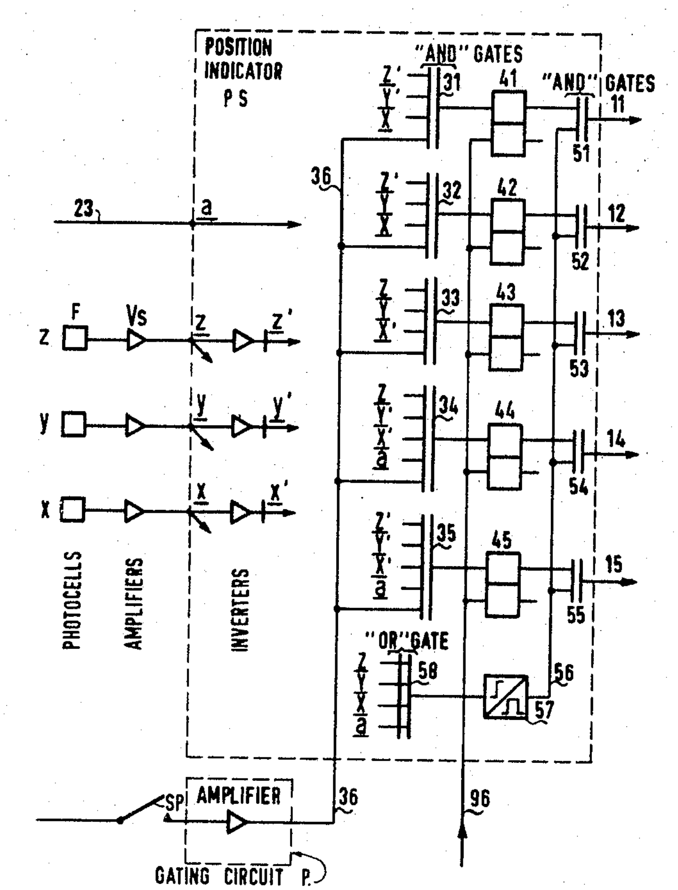
Figure 7:
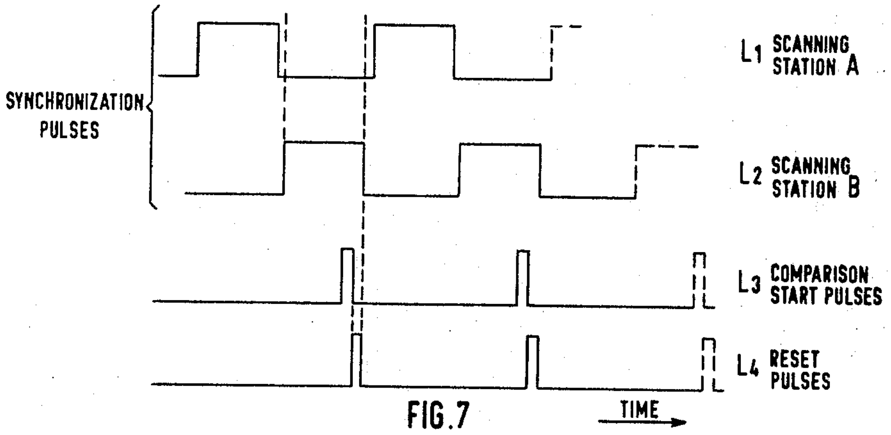
Figure 5:
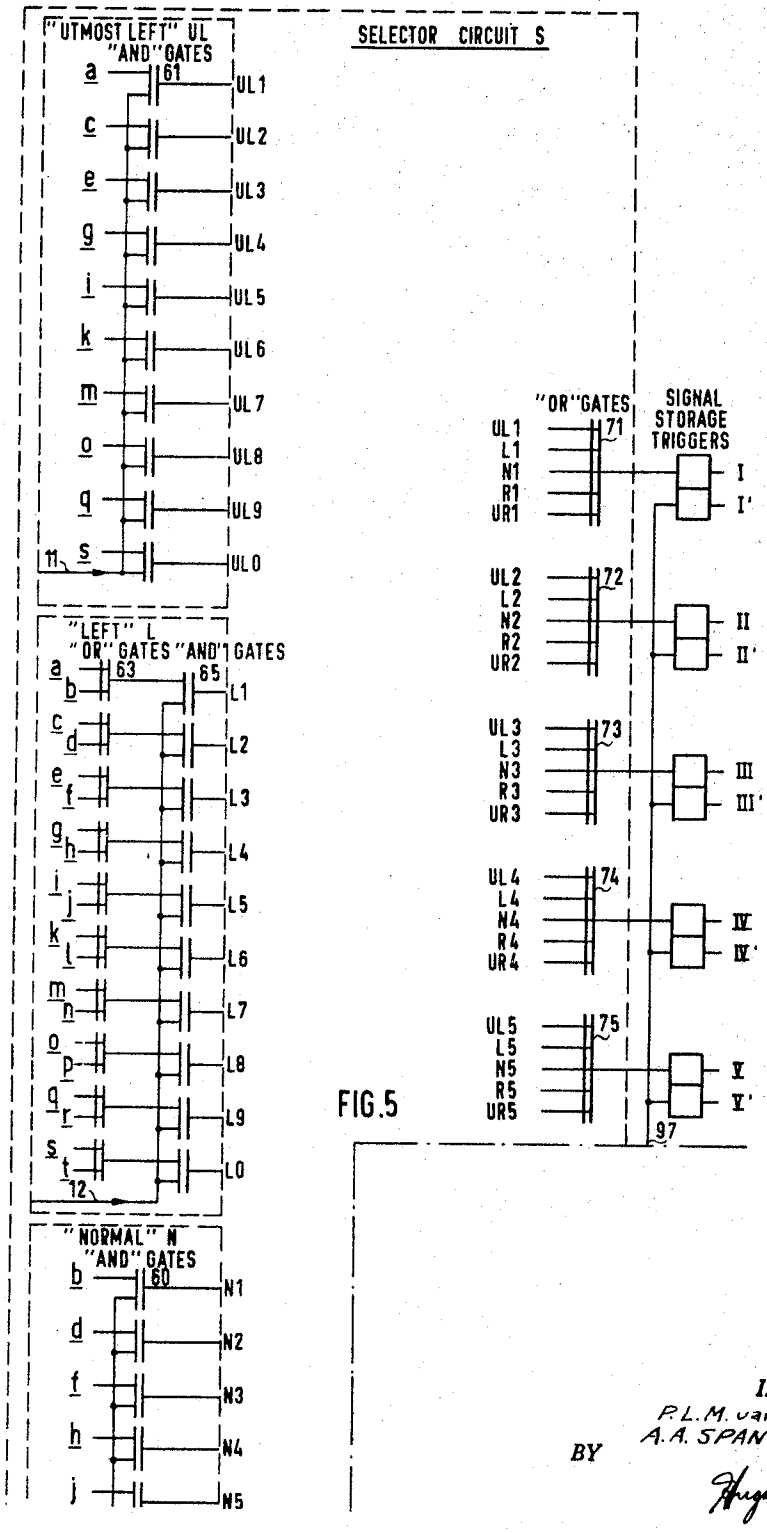
Figure 5:
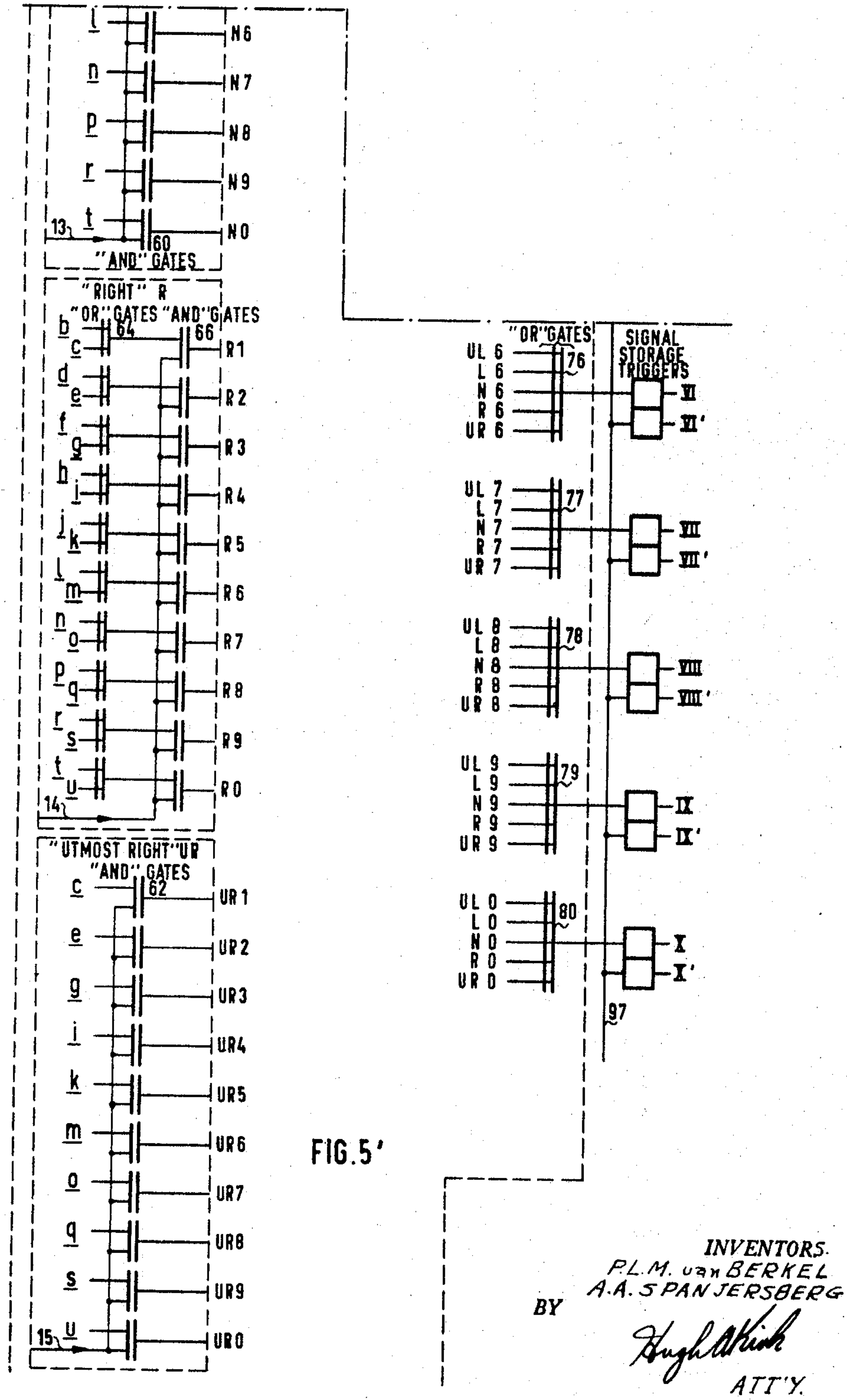
Figure 6:
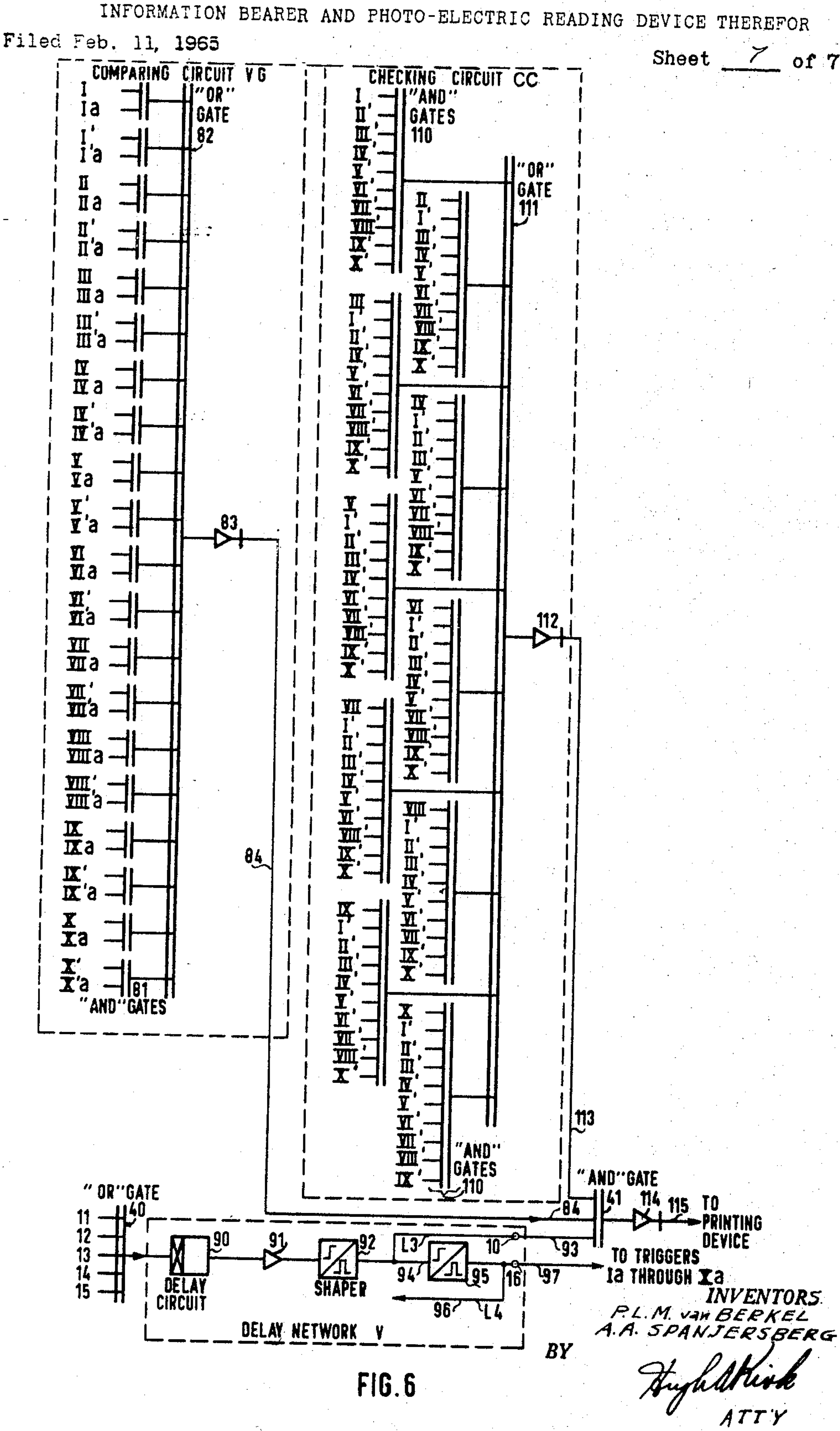

FIGS. 3 and 3′ show a schematic block wiring diagram of one embodiment of a reading device circuit for a marking grid area as shown in FIG. 1;

FIG. 4 is a wiring diagram of the position indicator and gating circuit shown in blocks in FIG. 3;

FIGS. 5 and 5′ is a wiring diagram of one of the selector circuits together with its associated signal storage triggers in one of the stations as shown in blocks in FIG. 3;

FIG. 6 is a wiring diagram of the delay network, comparing circuit, and checking circuit shown in blocks in FIGS. 3 and 3′; and FIG. 7 shows a pulse time diagram of the type produced from circuit of FIGS. 3—3′.

Referring first to FIG. 1, there is shown a part of an information bearer C having a marking-grid area MGA printed thereon to be examined together with two black synchronizing stripes SS at the left of said area MGA. The white marking-spaces MS and the distances or intervals IS between adjacent ones of them have been shown to be equal. The intervals IS must have such a color (indicated by hatching) that unmarked marking spaces and intervals IS have the same effect upon the photocell. The symbols or numbers "1," "2," "3," etc., through "0," corresponding to the various marking spaces, can be printed in these spaces in the same color, as has been indicated for the intervals IS in FIG. 1. For example, information bearers which produce this effect in the photocell may have the color of a partially saturated red. In this case the photocells may consist of a germanium or silicon semiconductor. These materials are sensitive in the red and infrared part of the spectrum. The infrared part of the spectrum is easily absorbed by a filter. Other colors besides red can be used with corresponding filters and properly chosen color sensitive solid-state photocells to produce this same uniform effect for an unmarked information bearer.

Figure 2:
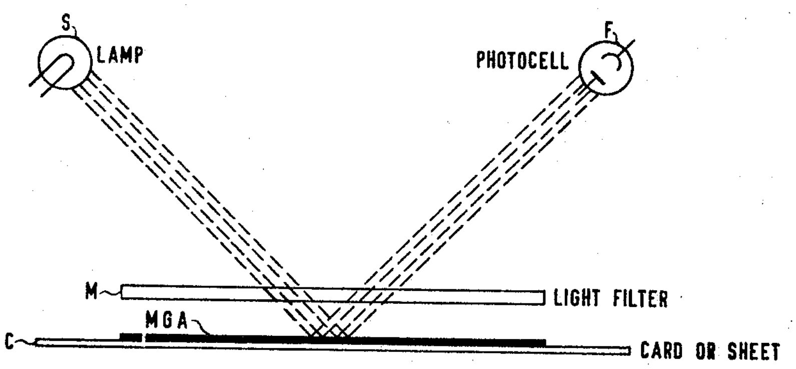
FIG. 2 is a schematic diagram of one embodiment of how a grid-area on a sheet as shown in FIG. 1 may be scanned photoelectrically through a light filter means.

In FIG. 2 the reading device comprises a lamp or light source S which emits white light. This white light is passed through a glass filter or medium M which only permits the red component of the white light to pass. After having passed this red filter M, the light is thrown on the information bearer, sheet, or card C on the place or grid MGA where this bearer C has to be scanned. Where the red component of the light is thrown on a white part of the information bearer, the light is reflected, as it is when the light is thrown on a red part of the information bearer. The reflected light is thrown on the photocells F. As these are sensitive to red light, there is an output photocurrent from each photocell, which receives red light. In this manner the marking grid areas MS and the marking spaces IS on the information bearer MGA give the same indication on the output terminals of a photocell. When a marking space is filled in with a not-red colored ink, i.e. black or blue ink, then that part of the surface does not reflect the red component of the light. For the photocell this part of the document seems to be black, so there is no output photocurrent during the scanning of this part of the information bearer and it is this reduction in photocurrent which is responsible for the transmission of the information. The photocells are sensitive to red light and when there is a cut-off of this light an impulse is formed in the output circuit. The reading device as a whole is insensitive to red-colored marks, but sensitive to not-red colored marks. By means of the above mentioned device a difference of output will be clearly perceptible, even if the filling-in has been done very partially or by means of a light blue ink. Thus the advantage of so coloring the marking-grid areas, as compared with those having a dark background, is that the result obtained from a photocell only changes if a filled-in marking space passes with any other contrasting color therein.

At the bottom of FIG. 1, a grid of adjacent scanning areas *x*, *y*, *z* and *a* through *u* are shown. The upper and lower rows show the areas scanned by the photocells at stations A and B, respectively, of the reading device.

If these areas are smaller than the room required by the photocells, it will be necesary to provide between each photocell and the relevant area a tapering tube made of plastic, e.g., through which the reflected light originating from a source of light, casting its light on the areas equally via an envelope, can be read by just the photocell assigned to that area.

In the case illustrated in FIG. 1 the marking-grid area MGA when moved in the direction shown by the arrow 30 will face the reading device in the normal position. The photocells *y* and *z* will deliver synchronizing pulses and the marking-spaces MS are in the correct positions with respect to areas *b, d, f, h, j, l, n, p, r* and *t* for the photocells associated with these areas to scan them.

If, however the information bearer has been displaced so much to the right that the photocell associated with area *y* does not deliver a synchronizing pulse, the photocell associated with area *a* will deliver a synchronizing pulse and the marking-spaces "1" through "0" will be partly positioned in areas *b* and *c*, *d* and *e*, *f* and *g*, *h* and *j*, *l* and *m*, *n* and *o*, *p* and *q*, *r* and *s* ,*t* and *u*, respectively. This position will be called: "right" (R).

If the information bearer has been displaced to the right farther still, so that the photocell associated with the area *z* does not deliver a synchronizing pulse, then only the photocell associated with area *a* will do so, and the marking-spaces "1" through "0" will be completely positioned in areas *c, e, g, i, k, m, o, q, s* and *u*. This position will be called "utmost right" (UR).

If the information bearer has been displaced so much to the left that the photocell associated with area *z* does not deliver a synchronizing pulse, the photocell associated with area *x* will, and the marking-spaces "1" through "0" will be partly positioned in areas *a* and *b*, *c* and *d*, *e* and *f*, *g* and *h*, *i* and *j*, *k* and *l*, *m* and *n*, *o* and *p*, *q* and *r*, *s* and *t*, respectively. This position will be called "left" (L).

If the information bearer has been displaced to the left farther still, so that the photocell associated with area *y* does not deliver a synchronizing pulse, then only the photocell associated with area *x* will do so, and the marking spaces "1" through "0" will be completely positioned in areas *a, c, e, g, i, k, m, o, q* and *s*, and this position will be called "utmost left" (UL).

In the transport of the information bearer, indicated by the arrow 30 in FIG. 1, each row of marking-spaces and synchronizing stripe SS is first scanned in scanning station A and then in scanning station B.

FIGS. 3 and 3′ show the block diagram of scanning station A and of the scanning station B, respectively, but for the description of the cooperation since stations A and B are identical, only the operation of station A will be described in detail. Starting at the left, one can distinguish in the scanning station A: a row of photocells F, the reference letters *a* through *u*, *x*, *y* and *z*, designating the areas from FIG. 1 to be scanned by them; a row of amplifiers V*s* following the photocells F; a circuit PS which determines the position of the information bearer MGA and the input terminal of which is connected to the output terminal of a gating circuit P which is energized by the closing of switch SP by the information bearer C when it is in its reading position. The output terminals of circuit PS are connected via conductor rails 11 through 15, respectively, to circuits utmost left UL, left L, normal N, right R and utmost right UR, which are parts of a selector circuit S and each of which can temporarily connect output terminals of photocell amplifiers V*s* to a group of triggers I through X. Scanning station B in FIG. 3' contains the same parts, of which the same blocks are given the same reference characters followed by a small letter *a*. Further the reading device contains delay network V, a comparing circuit VG and a checking circuit CC.

The pulses delivered by the photocells F are brought to the desired switching level by the amplifiers Vs. It has been described already with reference to FIG. 1 that the position of the information bearer with respect to the scanning station can be deduced from the pulses delivered by the photocells associated with areas *x*, *y*, *z* and *a*. This is done by means of a position indicator circuit PS. In the normal condition, this circuit PS is blocked by a gating circuit P. The latter or gating circuit P only releases circuit PS, if, during the transport of the information bearer MGA, a marking-grid area faces the scanning station, which may be controlled by sensing the edge of the bearer C itself either mechanically, or electronically. So if the photocells of the areas *x*, *y*, *z* or *a* should deliver spurious pulses, resulting from, e.g. black smudgy streaks on other parts than the marked grid area on the information bearer, circuit PS will not operate. Circuit P can also work for itself e.g. by means of photocells, which will or will not receive light in the correct position with respect to some lamps, according to whether or not the marking-grid area MGA on the information bearer C faces the first or the second scanning station correctly.

The position indicator circuit PS may be arranged as a code converter. Accordingly, as pulses are received from the photocells associated with areas *x*, *y*, *z* and *a*, a certain potential is applied to one of the conductor rails 11 through 15, for example, for 4.5 milliseconds, to trigger one of the circuits UL, L, N, R and UR in the selector S. Referring specifically to the wiring diagram of the position indicator circuit PS shown in FIG. 4, the output from the amplifiers Vs from the photocells F for the photocell areas *x*, *y* and *z* of the grid shown in FIG. 1 and the output from the sole photocell *a* via conductor 23 from FIG. 3. The outputs of amplifiers Vs for *x*, *y* and *z* may be passed also through a series of inverters to produce inverted outputs *x'*, *y'*, *z'*. Both the normal outputs of amplifiers *x*, *y*, *z* and *a* and the inverted outputs *x'*, *y'*, and *z'*, may then be connected to a series of five "and" gates 31, 32, 33, 34 and 35, which correspond, respectively, gates have the following corresponding inputs *x*, *y'* and to the five different positions respectively of "utmost left," "left," "normal," "right," and "utmost right," and which gates have the following corresponding inputs *x*, *y'* and *z'*; *x*, *y*, and *z'*; *x'*, *y* and *z*; *a*, *x'*, *y'* and *z*; and *a*, *x'*, *y'* and *z'*, respectively, each together with an input from the gating circuit P via conductors 36. Thus only that gate 31 through 35 is opened which corresponds to the position of the photocells *x*, *y*, *z* and *a* operated by the synchronizing marks SS shown in FIG. 1. The outputs of each of these "and" gates 31 through 35 are connected, respectively, to bi-stable triggers 41, 42, 43, 44 and 45, whose outputs in turn are connected to another series of "and" gates 51, 52, 53, 54 and 55. The inputs of each of these "and" gates 51 through 55 are also connected, via conductors 56, to the output of a pulse shaper 57 controlled by an "or" gate 58, to which gate 58 each of the outputs of the photocell amplifiers *x*, *y*, *z* and *a* are also correspondingly connected. Thus the shaper 57 produces in the output conductors 11 through 15 from the "and" gates 51 through 55, a synchronizing square pulse wave, similar to that shown in wave form L1 in FIG. 7, for controlling the corresponding selector circuit UL, L, N, R or UR of the selector S for passing the marked information read from the grid MGA.

Referring first to FIG. 3, the circuits UL, L, N, R and UR in selector S are connected, from each of the amplifier Vs output terminals of the associated photocells F *a* through *u* which correctly face the marking-spaces in the positions UL, L, N, R and UR of the information bearer. This is indicated for each of the last-mentioned circuits by one line in FIG. 3 so that the amplifier connections for "normal circuit" N are indicated by the line 20, those for "right" circuit R by the lines 20 and 21, those for "utmost right" circuit UR by the line 21, those for "left" circuit L by the lines 20 and 22, and those for "utmost left" circuit UL by the line 22.

In the "normal" position for the marking spaces MS, as shown in FIG. 1, the photocells selected are *b*, *d*, *f*, *h*, *j*, *l*, *n*, *p*, *r* and *t* corresponding to the same lettered contacts shown for one of the inputs to the "and" gates 60 in the "normal" selector circuit N in FIG. 5. To the inputs of each of these gates 60 is also connected the conductor 13 from the position indicator circuit PS shown in FIGS. 3 and 4, so that whichever one of the marking spaces in such "normal" position columns on the grid MGA are marked, the corresponding gates 60 will be opened to pass successive pulses from its corresponding row on the grid MGA onto its corresponding output terminal N1 through N9 and N0.

In the "utmost left" position, the photocell *x* through the position selector PS in FIGS. 1, 3 and 4 and conductor 11, selects the "utmost left" circuit UL in selector circuit S for connecting the corresponding outputs from photocells *a*, *c*, *e*, *g*, *i*, *k*, *m*, *o*, *q* and *s* to open the corresponding one of the ten "and" gates 61 for passing successive pulses for the marked spaces MS in the rows from the grid MGS to its corresponding output terminals UL1 through UL9 and UL0.

For the "utmost right" position, the photocells *c*, *e*, *g*, *i*, *k*, *m*, *o*, *q*, *s* and *u* will be aligned with the marking spaces MS numbered "1" through "9" and "0" on the marking grid area MGA, and via the conductor 15 from the position indicator PS, to select circuit UR to open its corresponding "and" gates 62 to successively pass the pulses for the marked spaces to its corresponding output terminals UR1 through UR9 and UR0.

For the in-between positions, namely the "right" and "left" positions, the outputs of the adjacent photocells are first passed through "or" gates 63 for the left circuit L, and "or" gates 64 for the right circuit R, the outputs of which are then passed through the "and" gates 65 in the "left" circuit L, and the "and" gates 66 in the "right" circuit R, the output terminals of which "and" gates 65 and 66 are correspondingly L1 through L9 and L0, and R1 through R9 and R0, respectively.

All of these output terminals UL1 through UR0 in FIG. 5 are correspondingly connected to the storage triggers I through X, each of which is shown to have an input "or" gate 71 through 80, the inputs to each of which gates 71 through 80 are connected to the correspondingly numbered output terminal of each of the circuits UL, L, N, R and UR, so that regardless of the position of the marking grid MGA with respect to the scanning photocells *a* through *u*, the correspondingly numbered group of terminals will energize the proper trigger I through X in succession according to the marked spaces MS in each row of the grid MGA. The "on" output of each of these triggers is given the same reference character as its associated trigger I through X, while the "off" output is indicated with a prime, namely terminals I' through X'. These "on" and "off" outputs are connected to the reading or recording device for the information scanned in the sheets C as well as to the comparing circuit VG and checking circuit CC which will now be described.

In order to detect an incorrect working of some part of the scanning station to prevent a wrong result from being obtained, as well as to establish with more certainty whether or not a marking-space is filled in, the scanning result from station A is stored in said number of trigger circuits I through X (see FIGS. 3 and 5) in order that it can be compared later on with the result obtained from the second scanning station B, which is recorded in the same way in trigger circuits I*a* through Xa in FIG. 3′. With a view to this comparison the output terminals of circuits I through X and circuits Ia through Xa are connected to the comparing circuit VG (see FIGS. 3′ and 6) which may be arranged as a code converter.

Specifically referring to FIG. 6, the comparing circuit VG comprises a series of twenty "and" gates 81, the inputs to each of which comprise a pair of terminals, one from each "on" and each "off" output of the ten storing triggers I through X in station A, and the other from each corresponding "on" and each corresponding "off" output from the ten storing triggers Ia through Xa in station B. The output of each of these twenty "and" gates 81 are connected to a single "or" gate 82 and thence via an amplifier 83 and conductor 84 to a final output "and" gate 41.

As the comparison may only be carried out during or after the second scanning, the comparing circuit VG is blocked in the normal state. In order that this blocking is removed at the right moment, there are delay networks in a circuit V, the input terminal of which is connected via an "or" gate circuit 40 from conductors 11 through 15 from the position indicator PS in the first scanning station A (see FIG. 3).

Referring specifically to FIG. 6 the delay network V comprises a delay circuit 90, the output of which may be through an amplifier 91 to a pulse shaper 92 from the output of which questioning or comparison start pulse L3, for example for 100$\mu$'s, as shown in FIG. 7, is produced by being delayed from the leading edge of the pulse L1 from scanning station A. This pulse L3 is fed via conductor 93 to the same final output "and" gate 41 mentioned above. Also from the output of the shaper 92, there is conductor 94 to a second pulse shaper 95 for production of the re-set pulse L4 (see FIG. 7) for re-setting all the trigger circuits during or after the second scanning of each row of marking spaces MS on the grid MGA. Thus this pulse L4 is passed from terminal 16 through conductor 96 back to the position indicator circuit PS shown in FIGS. 3 and 4, for re-setting all of the triggers 41 through 45. The conductor 97 from the terminal 16 which is also shown in FIGS. 3 and 5, is connected for re-setting all of the signal storage triggers I through Xa in both stations A and B.

Moreover a checking circuit CC is connected to the output terminals of triggers Ia through Xa in station B (see FIGS. 3′ and 6). This circuit CC has to check whether one and not more or less than one marking-space has been filled in. This circuit too may be arranged as a code converter.

Referring again to FIG. 6 the checking circuit CC is shown to comprise ten "and" circuits 110, the ten outputs of which are connected to an "or" circuit 111 and thence through an amplifier inverter 112 and conductor 113 also to the final output "and" gate 41. The output of this "and" gate 41 may be connected through an amplifier inverter 114 before being transferred to control the reading device for recording the markings which occur on the marking grid MGA of the sheet C passed under the photocells of the device of this invention. Each "and" circuit 110 has the "on" output of one of the triggers I through X in station A connected to the first one of its ten inputs and the "off" output of each of the other nine triggers connected to its other nine inputs, so that if more than one trigger I through X is operated at one time or no trigger I through X is operated, no impulse will be passed to the "or" gate 111, and thence the final output "and" gate 41 will not be opened, thereby indicating that an error has been made in filling in the marking spaces MS on the card C such as by marking none or more than one marking-space MS in one of the rows of the marking grid MGA. If it is desired to exempt the public from filling in zeros preceding the amount proper, the checking circuit may be so arranged that rows having no filled-in marking-space are accepted until a row having a filled-in marking-space is scanned.

Thus by means or the final output "and" gate 41 (see FIGS. 3′ and 6), connected by an output terminal to the comparing circuit VG as well as to the checking circuit CC, it is achieved that only if the two scanning stations deliver the same result, and if moreover this result satisfied the requirements of the check, that a result is passed on to the reading device.

Specifically referring to FIG. 7, wave forms $L_1$, $L_2$, $L_3$ and $L_4$ are shown, plotted against the time. The synchronizing pulses of the first and of the second scanning stations A and B are shown in wave forms $L_1$ and $L_2$, respectively. The comparison start pulses $L_3$ may be produced in delay circuit V from the leading or trailing edges of the synchronizing pulses $L_1$, and the reset pulses $L_4$ may be derived from the leading edge of the synchroning pulses $L_1$, or from the trailing edges of the comparison start pulses $L_3$. The pulse/pause ratio of the synchronizing pulses of the first and of the second scanning station is 5:6. With a period duration of 10 milliseconds, the synchronizing pulses $L_1$ and $L_2$ last 4.5 milliseconds. The second scanning station is shifted in place with respect to the first by exactly the width of one space. So in the above mentioned case all the pulses of the second scanning stations are shifted in time with respect to those of the first by 5 milliseconds.

The comparison start pulse $L_3$ may begin 4 milliseconds after the beginning of the synchronizing pulse of the second scanning station B. The duration of the comparison start pulse $L_3$ may amount to 100 $\mu$'s. The reset pulse $L_4$ may be started at the trailing edge of the comparison start pulse. This pulse may have a duration of 100$\mu$'s as well. So in this manner the reading of the first row has finished before the second row is read. This is not necessary, however. The comparison start pulse $L_3$ and reset pulses $L_4$ may be started later.

It also is feasible to start the comparison start pulse $L_3$ at the trailing edge of the synchronizing pulse $L_2$ of the second scanning station and to have it followed by the reset pulse $L_4$. The triggers of the first scanning station receive a reset pulse then (100$\mu$'s) while the reading amplifier is reading the second row. This is possible, because the reading amplifier pulse, originating from a filled-in space is always longer than 100$\mu$'s. So the choice of the start moments of the comparison start pulse $L_3$ and the reset pulse $L_4$ are not critical.

While there is described above the principles of this invention in connection with specific apparatus, it is to be clearly understood that this description is made only by way of example and not as a limitation to the scope of this invention.

What is claimed is:

1. A photoelectric reading device, insensitive to a given color, for reading an information bearer, the combination comprising:

(A) an information bearer having:
  (a) a marking grid area indicated in said given color,
  (b) marking grid spaces in said area also indicated by markings in said given color, and
  (c) scanning stripes aligned with said spaces for determining the position of said bearer relative to a photoelectric means indicated in a color contrasting with said given color to which said contrasting color said photoelectric reading device is sensitive, (B) a photoelectric means sensitive to said given color and insensitive to said contrasting color directed toward said information bearer, (C) light filter means for permitting only said given color to be transmitted from said marking grid area and said marking spaces on said information bearer to said photoelectric means, (D) means connected to said photoelectric means responsive to its said insensitivity, which corresponds to its scanning said scanning stripes and marks in said grid spaces made in a color contrasting to said given color, and (E) means connected to said photoelectric means for determining the position of said bearer relative to said photoelectric means.

2. A reading device according to claim 1 which is insensitive to the color red, and wherein said information bearer has a marking grid area and marking grid spaces indicated in red.

3. A reading device according to claim 2 wherein said scanning stripes are indicated in black.

4. A photoelectric reading device for an information bear, said information bearer having:

(A) marking grid area,
(B) marking grid spaces, and
(C) scanning stripes aligned with said spaces, and said reading device comprising:
 (1) two identical scanning stations each having:
  (a) marking-space photocell scanners,
  (b) scanning stripe photocell scanners,
  (c) position indicating means connected to said scanning stripe photocell scanners for determining the position of said bearer relative to said scanners,
  (d) selector circuits connected to said position indicating means and said marking space photocell scanners for controlling which scanners will scan said grid spaces depending upon said relative position of said bearer thereto, and
  (e) storage devices corresponding to each marking space photocell scanner and connected to said marking space photocell scanners and said selector circuits;
 (2) a comparator circuit connected to said storage devices of each of said scanning stations to determine if they obtained the same indication from said marking grid spaces on said information bearer, and
 (3) means for transferring said properly compared indications.

5. A reading device according to claim 4 wherein said grid includes rows of spaces aligned with each scanning stripe and wherein said device includes a checking circuit connected to said storage devices at one of said stations for checking if each row of marking spaces contains one and only one marked space.

6. A reading device according to claim 4 including a delay network connected to said position indicating means in one of said stations for controlling the operation of said comparing circuit and resetting said storing devices.

7. A reading device according to claim 4 including a gating circuit means controlled by the position of said information bearer under said reading device for controlling the operation of said position indicating means in at least one of said stations.

8. A reading device according to claim 4 including amplifier means for amplifying the output of said scanners and connected to each of said scanning photocells in each of said stations.

9. A photoelectric reading device for an information bearer with a marking-grid area, said area comprising rows of marking-spaces toned with a light shade of color in a grid area of a darker shade, and beside the marking area columns of synchronizing marks, characterized in that the device contains two identical scanning stations, each station comprising a row of photocells which scan areas adjacent to each other and of a size of at the most that of the marking-space, which photocells observe unmarked marking spaces and intervals between marking-spaces as equal, means connected to the photocells scanning said column of synchronizing mark for determining which photocells scan marking-spaces, a first set of memory circuits in one of said stations, means for connecting one row of said photocells of one station for scanning the marking-spaces to said first set of memory circuits, a second set of memory circuits in the other of said stations, means for connecting the other row of said photocells of said other station for scanning said same row of marking-spaces to said second set of memory circuits, and means for comparing the states of both said sets of memory circuits.

10. A reading device according to claim 9 including a check circuit connected to one of said set of memory circuits at one of said stations for determining if each row of marking spaces contains one and only one marked space.

11. A reading device according to claim 9 including a delay network connected to said marking space determining means in one of said stations for generating pulses for re-setting said memory circuits after said memory circuits have operated said comparing means.

References Cited

UNITED STATES PATENTS

| | | | |
|---|---|---|---|
| 2,185,233 | 1/1940 | Stuart. | |
| 2,268,498 | 12/1941 | Bryce | 235—61.115 XR |
| 2,575,034 | 11/1951 | Tyler et al. | |
| 2,931,916 | 4/1960 | Sinn. | |
| 2,932,006 | 4/1960 | Glauberman | 250—208 XR |
| 2,963,220 | 12/1960 | Kosten et al. | |

FOREIGN PATENTS

| | | |
|---|---|---|
| 589,383 | 4/1958 | Italy. |

MAYNARD R. WILBUR, *Primary Examiner.*

SOL SHEINBEIN, *Assistant Examiner.*

U.S. Cl. X.R.

235—61.11; 61.12; 250—219

U.S. DEPARTMENT OF COMMERCE

PATENT OFFICE

Washington, D.C. 20231

UNITED STATES PATENT OFFICE

CERTIFICATE OF CORRECTION

Patent No. 3,437,793 April 8, 196(

Petrus Ludovicus Maria van Berkel et al.

It is certified that error appears in the above identified patent and that said Letters Patent are hereby corrected as shown below:

Column 5, line 45, cancel "gates have the following corresponding inputs x, y/ and". Column 9, line 13, "bear" should read -- bearer --.

Signed and sealed this 14th day of April 1970.

(SEAL)
Attest:

Edward M. Fletcher, Jr.
Attesting Officer

WILLIAM E. SCHUYLER, JI
Commissioner of Patents